United States Patent [19]

Anderson

[11] 3,940,513

[45] Feb. 24, 1976

[54] METHOD OF MAKING MOISTURE-RESISTANT POLYURETHANE-BASED PRESSURE-SENSITIVE ADHESIVES

[75] Inventor: Ralph L. Anderson, Columbia, S.C.

[73] Assignee: Anchor Continental, Inc., Columbia, S.C.

[22] Filed: Feb. 19, 1974

[21] Appl. No.: 443,917

[52] U.S. Cl. ............... 427/207; 427/385; 427/391
[51] Int. Cl.² .................................................. C09J 7/04
[58] Field of Search .... 117/122 PA, 122 P, 122 PF, 117/76 A, 68.5; 427/207, 391, 385

[56] References Cited
UNITED STATES PATENTS

| | | | |
|---|---|---|---|
| 3,437,622 | 4/1969 | Dahl | 117/122 X |
| 3,625,752 | 12/1971 | Korpman | 117/122 X |
| 3,743,616 | 7/1973 | Kest | 117/122 X |
| 3,743,617 | 7/1973 | Kest | 117/122 X |
| 3,756,848 | 9/1973 | Dahl | 117/122 |
| 3,761,307 | 9/1973 | Dahl | 117/122 |
| 3,769,071 | 10/1973 | Trancik | 117/122 |
| 3,778,302 | 12/1973 | Dahl | 117/122 X |
| 3,796,678 | 3/1974 | Bartizal | 117/122 X |
| 3,802,988 | 4/1974 | Dahl | 117/122 |
| 3,821,056 | 6/1974 | Reardon | 117/122 X |

Primary Examiner—Bernard D. Pianalto

[57] ABSTRACT

In U.S. Pat. Nos. 3,437,622 and 3,761,307 and U.S. Pat. application Ser. No. 323,944, filed January 15, 1973 and now abandoned, are disclosed pressure-sensitive adhesives, the required cohesive strength of which is provided by a polyurethane polymer in place of the natural or synthetic rubber of the prior art. However, some of such polyurethane-based adhesives are not highly resistant to moisture unless special procedures are used. For example, they may lose 20 to 75% of their adhesiveness after exposure for 3 days or less to 90% relative humidity at 150°F. This invention discloses means of overcoming this problem by combinations of excluding moisture, adding minor proportions of the reaction-products of hydroxylated elastomers or of hexamethylene tetramine.

25 Claims, No Drawings

METHOD OF MAKING MOISTURE-RESISTANT POLYURETHANE-BASED PRESSURE-SENSITIVE ADHESIVES

The following Examples illustrate detailed procedures for making my new adhesives, modifications and extensions of which within the scope of the appended claims, will be evident to those skilled in the art. (All proportions and amounts herein given are by weight unless otherwise noted.)

EXAMPLE 1

A. The polyoxypropylene ether of glycerin of molecular-weight (mw) 3000 and hydroxyl number 35 is mixed with tolylene diisocyanate (commercial material containing 80% 2,4 and 20% 2,6 isomers) in proportion to give a ratio of the number of equivalents of hydroxyl (OH) to isocyanate (NCO) of 1:1.5. The mix is heated for 4 hours at 250°F. and kept from exposure to moisture in the air or elsewhere.

B. A hydroxylated elastomer, polybutadiene of OH number 45, viscosity 200 poises at 30°C., 7.5 lbs./gal., iodine no. 355, 60% trans, 20% cis (1-4), 20% vinyl (1-2), dissolved in 20% of its weight of toluene is mixed with tolylene diisocyanate (TDI) in the proportion to give a ratio of OH:NCO of 1:1.5 and the mix heated for 4 hours at 250°F. protected from moisture.

10% of B by weight is blended with 90% of A. Tackifying resins in the form of the ethylene glycol ester of hydrogenated rosin and the triethylene glycol ester of hydrogenated rosin, each in amount of 25% of the weight of polyol plus elastomer are dissolved to a 70 weight % solution in toluene and added to the blend. Use of solvent slows the reaction and increases the pot-life of the prepolymers. Catalyst is then added in the form of stannous octoate in the amount of 1% of the weight of the 2 prepolymers. The mix is then coated on a polyurethane-impregnated paper (see U.S. Pat. Nos. 3,702,781; 3,752,700; 3,778,302; and U.S. patent applications Ser. Nos. 236,956, filed Mar. 22, 1972 and 323,944), both now abandoned, in amount to yield a final, dry coating-weight of 5 grams/sq.ft. The so-coated paper is heated for ½ to 1½ minutes at 325°F. The product was a tacky, pressure-sensitive (ps) adhesive tape which lost only 5% of its initial adhesiveness after 3 days exposure to 90% relative humidity at 150°F.

EXAMPLE 2

The procedure of Ex. 1 was followed, except that polyoxypropylene (the ethylene oxide adduct of polypropylene glycol) of OH no. 56 and mw 2000 was used in place of the polyoxypropylene ether of glycerin. A similar moisture-resistent tape was produced.

EXAMPLE 3

The procedure of Ex. 1 was used, except that in part B, the hydroxylated polybutadiene was replaced by a styrene-butadiene copolymer with 20% styrene, 80% butadiene, OH no. 42, 60% trans, 20% cis (1-4), 20% vinyl (1-2), viscosity 295 poises at 30°C., 7.6 lbs./gal., iodine no. 335. A similar product was produced.

EXAMPLE 4

The procedure of Ex. 1 was followed, except that in part B, the hydroxylated polybutadiene was replaced by an acrylonitrile copolymer with 15% acrylonitrile and 85% butadiene, OH no. 39, 60% trans, 20% cis (1-4) 20% vinyl (1-2), viscosity 500 poises at 30°C., 7.7 lbs./gal., iodine no. 345. A similar product was produced.

EXAMPLE 5

The procedure of Ex. 3 was used, except that in part A, the polyoxypropylene ether of glycerin was replaced by the ethylene oxide adduct of polypropylene glycol, OH no. 56, mw 2000. A similar result was yielded.

EXAMPLE 6

The procedure of Ex. 1 was followed and to the final blend of parts A and B was added 2% of the weight of solids therein, of hexamethylene tetramine (HT). The product had increased moisture-resistance, losing inappreciably in adhesion after the humidity test.

It is found generally that addition of 0.6 to 5% HT based on total prepolymer wt., used as in Ex. 6, increases the moisture-resistance. In case the polyol polymer (as in part A of Ex. 1) contains moisture, the curability of the adhesive suffers but unless the moisture content is high this can be overcome by heating the polymer for about 30 minutes at 150° to 200°F.

EXAMPLE 7

This is an example of a one-step procedure to made an excellent moisture-resistant ps adhesive without the use of solvent. The procedures are carried out with exclusion of moisture. 90 parts of the propylene oxide adduct of trimethylol propane of mw 2000 and OH no. 56, are warmed to 200° to 220°F. in order to dissolve therein 27 parts of the triethylene glycol ester of hydrogenated rosin and 27 parts of the glycerol ester of hydrogenated resin. With this solution is mixed 10 parts of the hydroxylated polybutadiene of Ex. 1, 2 parts of stannous octoate catalyst, TDI and polymethylene polyphenyl diisocyanate (WUC) in proportions to give a ratio of equivalents of total NCO to total OH of 1.5:1, the TDI supplying 80% of the NCO and the WUC 20%. There is then mixed in 2 parts HT and the final mix promptly coated on the impregnated backing of Ex. 1 and heated at 250° to 270°F. for 1 to 2 minutes. An excellent moisture-resistant ps adhesive tape was obtained.

The other herein disclosed hydroxylated elastomers may be used in the Examples in place of the polybutadiene. Other well-known catalysts of activity equal to that of stannous octoate can be used, such as stannous neodecanoate and lead octoate. If backings impregnated with natural rubber or synthetic rubber latices or solutions are used, the amount of polyisocyanate is increased to react with the active hydrogen of the impregnant and backing. If the WUC is not used (TDI alone), for example as in Ex. 7, the cure requires at least 2 minutes at over 300°F. but the pot-life of the mix is longer; it requires only about 4 seconds at 340°F. or 20 sec. at 180°F. if WUC alone is used and the pot-life is shorter. The hydroxylated elastomer polymer, as in part B of Ex. 1, may be used in the amount of 6 to 25% of the weight of the blend, the preference being for about 10%. A satisfactorily moisture-resistant product can also be made using the part B prepolymer without the part A prepolymer of Ex. 1, but the cure is slower, the adhesive has lower shear resistance, the resistance to high temperature is lower and the elastomer is more expensive. The blend of Ex. 1 can be used directly after mixing but the final adhesive is improved by letting the blend stand for 24 to 48 hrs. at room temperature or by heating for 3 to 5 hrs. at 150°F. The polyol reaction-product, as in Ex. 1, part A, may also be kept at room temperature for 24 to 48 hrs. out of contact with moisture with resulting improvement.

Tackifying resin may be used in amount of 40 to 150%, preferably about 50%, of the weight of the prepolymers used. Preferably the resins should have an acid no. below about 15 (otherwise enough additional NCO is used to react with the active hydrogen in them) and may be esters of rosin, tall oil, hydrogenated rosin, polymerized rosin or rosin stabilized by heating with a small amount of iodine (known in the trade as "Galex") or the cheaper resins such as the diethylene glycol esters of petroleum aromatic residues. Such esters may also be of ethylene glycol, glycerol or pentaerythritol. 10 to 40 (preferably 25) wt. per cent of the resin may be of low mw. Examples of low mw resins are the diethylene glycol and methyl esters of rosin, tall oil or hydrogenated, polymerized or stabilized rosin; of high mw are the glycerol and pentaerythritol esters of rosin, tall oil and hydrogenated polymerized or stabilized rosin. Resins of melting-point 100° to 122°C. I consider to be of high mw and are slightly less compatible. i.e. are not largely soluble in the solvent or in my polyols. Such resins are added either in solution in the warm polyols or dissolved, for example in toluene or toluene diluted with up to about 30% heptane, to about 70% concentration, The solvent also slows the reaction and lengthens the pot-life. I have found, however, that I can use a single resin of m.p. 74°–122°C. (preferably 100-122), for example pentaerythritol esters as noted above, with improved high temperature resistance. As in Ex. 2, the polyoxypropylene may be the propylene oxide adduct of polypropylene glycol. The polyol, as in Ex. 1 or 2, part A, can vary in mw from 1500 to 5000, but 3000 to 4500 is preferred. The polyol OH no. can vary between 30 and 100, but 35 to 50 is preferred.

The hydroxylated elastomers, as in Ex. 1, part B are all liquids at room temperature and, although those of the Examples are preferred, they may also include hydroxylated polyisoprene and hydroxylated natural rubber. Their OH nos. may vary from 20 to 60, 39 to 56 being preferred; their viscosities, densities and iodine nos. may vary plus or minus 5% and their proportions of trans, cis and vinyl may vary from 57–63, 19–21 and 19–21, respectively. The per cent styrene in the hydroxylated butadiene-styrene can vary from 20–40; and of acrylonitrile in acrylonitrile-butadiene from 13 to 17%.

The catalysts, as used in Ex. 1, may be the usual polyurethane catalysts such as stannous octoate and neodecanoate and lead octoate, and others of roughly equal activity. They are used in amounts from 0.3 to 5% of the total weight of prepolymers, preferably about 1%.

The adhesive is coated on the backing in amount from 3 to 11 grams per sq.ft. dry solids. The curing with polyols of OH no. 30–41 may be from ½ to 1½ min. at 310° to 350°F. while those of OH nos. from 41 to 50 are cured at 250°F. for 1 to 1½ min. or for ½ min. at 350°F. When using polyols of higher OH nos., a satisfactory product may be made without preheating and without HT if kept dry but when using those of lower OH no., the preheating is required. In any case the use of HT improves the moisture-resistance. Preheating is not needed when moisture is excluded although this is a wise precaution as is standing at room temperature for 24–48 hrs.

I classify the polyols I use as of high, intermediate or low OH no. - those of about 41 to 100 are high and react faster with NCO and are cured for about ½ min. at 350°F. or 1–1½ min. at 250°F. while those of 30 to 41 are low and the prepolymers from them often need to be preheated before use, for example, for 30 minutes at 150° to 200°F. The latter are cured, for example, for ½ to 1½ min. at 310° to 350°F. The prepolymers from polyols of high OH nos. can be cured without preheat and, if kept dry, do not need HT, while those from low OH no. polyols usually have HT added. The polyols of low OH no. give more tacky final adhesive. Inert, volatile solvents other than toluene can be used, especially 30% heptane in toluene.

The backing materials used are as in Ex. 1 and are best those containing polyurethane polymers attached through urethane linkages to NCO-reactive hydrogen (active hydrogen) contained in the backing, and, of course, must be reasonably stable at the temperatures I use. If required, the backings can be provided with well-known release coatings on the backside and with anchor- or tie-coatings on the side coated with adhesive. Release-coatings include about 0.1 mil thick silicones, polyvinyl carbamate (U.S. Pat. No. 2,532,011), acrylate copolymers, polyvinyl behenate, vinyl stearate and maleic or acrylic anhydride. Tie-coats include treating the surface to corona discharge (especially with film backings) or coating with emulsions of neoprene or butadienestyrene rubber and tackifying resin. If barrier coatings are needed, for example to prevent migration of adhesive and backing components, there can be used 0.3 to 0.4 mil coatings of cross-linking acrylic copolymer, polyvinyl chloride copolymer or a toluene, xylol or xylolmineral spirits solution containing 50% alkyd resin comprising phthalic acid-glycerin ester with 50% melamine-formaldehyde resin the ester containing 20% soybean oil or linoleic acid and using 0.5 to 1% paratoluene sulfonic acid as resin condensation catalyst. Other backings may include impregnated cloth, glass-cloth, rayon, nylon, cellulose ethers and esters, polyesters, silk, polyethylene, polypropylene, polybutylene, polyvinyl esters and ethers, polyvinyl alcohol and partially hydrolyzed polyvinyl and cellulose ester. In order to save adhesive it is best to impregnate porous backings.

Having thus described by invention, what I claim is:

1. A method of making a moisture-resistant, polyurethane-based, pressure-sensitive adhesive which comprises carrying out the following steps with substantial exclusion of moisture in steps (1) through (5): (1) reacting an aromatic polyisocyanate with polyols of average molecularweight between 1500 and 5000 and hydroxyl number between 30 and 100 containing dissolved, compatible, tackifying resins in amount between 40 and 150 per cent of the combined weight of the polyol of step (1) and the elastomer of the following step (2), in the proportion of from 1.1 to 1.7 equivalents of isocyanate per equivalent of hydroxyl; (2) reacting a liquid hydroxylated elastomer of hydroxyl number between 20 and 60 with an aromatic polyisocyanate in the proportion of between 1.7 and 1.1 equivalents of isocyanate per equivalent of hydroxyl; (3) adding to the product of step (1) an amount of the product of step (2) to make a mixture containing between 6 and 25% of the product of step (2); (4) adding active polyurethane catalyst to the product of step (3) in amount between 0.3 and 5 per cent of the weight of polyurethane polymers therein; (5) coating the product of step (4) upon a stable, flexible, inert backing material in amount to leave a final weight of solids of between 3 and 11 grams per square foot; (6) heating the product of step (5) at a temperature of between 180° and 360°F. for a time sufficient to substantially complete the reaction of isocyanate and leave a dry coating, but not substantially longer.

2. The method of claim 1 wherein the said polyisocyanate of step (1) is tolylene diisocyanate.

3. The method of claim 1 wherein the said polyisocyanate is polymethylene polyphenyl diisocyanate.

4. The method of claim 1 wherein the said polyisocyanate is a mixture of tolylene diisocyanate and polymethylene polyphenyl diisocyanate.

5. The method of claim 1 wherein the said polyol of step (1) has a molecular-weight of between 3000 and 4500 and a hydroxyl number between 35 and 50.

6. The method of claim 1 wherein the said proportion of step (1) is 1.5.

7. The method of claim 6 wherein the said proportion of step (2) is 1.2.

8. The method of claim 1 wherein the said hydroxyl number of step (2) is about 45.

9. The method of claim 1 wherein the said elastomer of step (2) is selected from the class consisting of hydroxylated polybutadiene, hydroxylated butadiene-styrene with 20 to 40 per cent styrene, hydroxylated butadiene-acrylonitrile with 13 to 17 per cent acrylonitrile, hydroxylated polyisoprene and hydroxylated natural rubber.

10. The method of claim 1 wherein the said tackifying resin of step (1) is selected from mixtures containing 10 to 40 per cent of resins selected from the class consisting of the methyl, triethylene glycol and diethylene glycol esters of rosin, tall oil, hydrogenated polymerized and stabilized rosin with (2) resins selected from the class consisting of the glycerol and pentaerythritol esters of rosin, tall oil and hydrogenated polymerized and stabilized rosin.

11. The method of claim 1 wherein the said catalyst of step (4) is at least as active as stannous octoate.

12. A method of making a moisture-resistant, polyurethane-based, pressure-sensitive adhesive which comprises carrying out the following steps with substantial exclusion of moisture in steps (1) through (5): (1) reacting polyisocyanates selected from the class consisting of tolylene diisocyanate, polymethylene polyphenyl diisocyanate and mixtures of same, with polyols of molecular-weight between 2000 and 4500 and hydroxyl numbers between 35 and 50, in the proportion of 1.5 equivalents of isocyanate per equivalent of hydroxyl and adding thereto equal amounts of the resins of claim 10, (1) and (2), the total resin being 50 per cent of the weight of the said polyols plus the said polybutadiene of the following step (2), the said resins being dissolved to a 70 weight per cent solution in toluene; (2) reacting polybutadiene of hydroxyl number about 45 with the said polyisocyanates of step (1) in the proportion of 1.2 equivalents of isocyanate per equivalent of hydroxyl and the said polybutadiene being dissolved in 20 per cent of its weight of toluene; (3) mixing the product of step (2) with the product of step (1) in amount to comprise 10 per cent of the combined weight of the polyurethane reaction-products of steps (1) and (2); (4) adding stannous octoate to the product of step (3) in the amount of between 0.3 and 5 per cent of the total weight of polyurethane polymers in step (3); (5) coating the product of step (4) upon a stable, flexible, inert backing material in amount to provide from 3 to 11 grams of dry coating per square foot; and (6) heating the product of step (5) to a temperature and for a time sufficient to evaporate the toluene and complete the reaction of the isocyanate but not substantially beyond this point.

13. The method of claim 1 wherein the product of the said step (4) is allowed to stand for 24 to 48 hours at room temperature protected from moisture before use.

14. The method of claim 13 wherein the product of the said step (4) is allowed to stand for 24 to 48 hours at room temperature protected from moisture before it is used.

15. The method of claim 1 wherein the product of the said step (4) is heated for from 3 to 5 hours at about 250°F. protected from moisture, before it is used.

16. The method of claim 15 wherein the product of the said step (2) is heated for from 3 to 5 hours at about 250°F. protected from moisture, before it is used.

17. The method of claim 14 wherein there is added to the product of step (4) 0.6 to 5 per cent of the combined weight of polyurethane polymers therein, of hexamethylene tetramine.

18. The method of claim 16 wherein there is added to the product of step (4) 0.6 to 5 per cent of the combined weight of polyurethane polymers therein, of hexamethylene tetramine.

19. A simplified method of making a moisture-resistant, polyurethane-based, pressure-sensitive adhesive without the use of volatile solvent, which comprises carrying out the following steps with substantial exclusion of moisture in steps (1) through (4): (1) warming polyols of average molecular-weight between 1500 and 5000 and hydroxyl number between 30 and 100, in order to dissolve therein the said tackifying resins of claim 10, in the amount of 40 to 150 per cent of the combined weight of the said polyols and the said elastomer of the following step (2), (2) adding to the product of step (1) a liquid hydroxylated elastomer of hydroxyl number between 20 and 60 in amount such that the said elastomer comprises from 6 to 25 per cent of the combined weight of the said polyols and the said elastomer; (3) adding to the product of step (2) a polyisocyanate selected from the class consisting of tolylene diisocyanate, polymethylene polyphenyl diisocyanate and mixtures of same in the proportion to yield from 1.1 to 1.7 equivalents of total isocyanate per equivalent of hydroxyl; (4) adding to the product of step (3) an active polyurethane catalyst in amount from 0.3 to 5 per cent of the combined weight of the polymers of step (1) and the elastomer of step (2); (5) promptly coating the product of step (4) upon an inert, flexible backing material in amount between 3 and 11 grams per square foot of backing material and; (6) promptly heating the product of step (5) at a temperature of between 180° and 375°F. for a time sufficient to complete the reaction of isocyanate but not substantially longer.

20. The method of claim 19 wherein the said polyols of step (1) are of molecular-weight between 3000 and 4500 and of hydroxyl number between 35 and 50; the said tackifying resins of claim 19, (1) and (2), are each in the amount of 25 per cent; the said elastomer of step (2) has an hydroxyl number of between 35 and 45 and its proportion is about 10 per cent of the combined weight of polyols plus elastomer; the catalyst of claim 19, step (4), is in the amount of about 1 per cent and is at least as active as stannous octoate; the polyisocyanate of step (3) is in the proportion of about 1.5 total equivalents of isocyanate per equivalent of hydroxyl; and the heating is for from 5 seconds to 2 minutes at a temperature between 375° and 180°F., sufficient to completely react the isocyanate but not substantially beyond.

21. The method of claim 19 wherein there is further added to the said step (3) hexamethylene tetramine in the amount of 0.6 to 5 per cent of the weight of the combined polyurethane polymers.

22. The method of claim 20 wherein to the final mix is added 2 per cent of the weight of combined polyurethane polymers, of hexamethylene tetramine.

23. The method of claim 20 wherein the said polyisocyanate is polymethylene polyphenyl diisocyanate and the said heating is for about 5 seconds at 375°F.

24. The method of claim 1 wherein the said heating is for about 1 minute at about 340°F.

25. The method of claim 1 wherein the said backing material is paper impregnated with polyurethane polymers attached through urethane linkages to at least part of the active hydrogen of the paper.

* * * * *